(12) United States Patent
Schmidt et al.

(10) Patent No.: US 8,457,840 B2
(45) Date of Patent: Jun. 4, 2013

(54) MOTOR VEHICLE

(75) Inventors: Walter Schmidt, Rennertshofen (DE);
Alois Stauber, Ingolstadt (DE); Martin Schuessler, Koesching (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/579,118

(22) PCT Filed: Feb. 3, 2011

(86) PCT No.: PCT/EP2011/000498
§ 371 (c)(1),
(2), (4) Date: Dec. 21, 2012

(87) PCT Pub. No.: WO2011/101095
PCT Pub. Date: Aug. 25, 2011

(65) Prior Publication Data
US 2013/0096775 A1     Apr. 18, 2013

(30) Foreign Application Priority Data

Feb. 20, 2010   (DE) .......................... 10 2010 008 741

(51) Int. Cl.
*G06F 7/70* (2006.01)
(52) U.S. Cl.
USPC ............................... 701/36; 701/70; 701/110
(58) Field of Classification Search
USPC ................. 701/36, 70, 84, 99, 33.4, 101, 110
See application file for complete search history.

(56) References Cited

U.S. PATENT DOCUMENTS

| | | | |
|---|---|---|---|
| 2,328,392 A | | 8/1943 | Neracher et al. |
| 6,125,314 A | * | 9/2000 | Graf et al. ........................ 701/53 |
| 2007/0219697 A1 | | 9/2007 | Unterforsthuber |
| 2012/0290187 A1 | * | 11/2012 | Oesterreicher et al. ......... 701/99 |

FOREIGN PATENT DOCUMENTS

| | | |
|---|---|---|
| DE | 195 36 038 | 4/1997 |
| DE | 102 35 165 | 2/2004 |
| DE | 103 51 656 | 6/2005 |
| DE | 10 2004 002 114 | 8/2005 |
| DE | 10 2006 012515 | 9/2007 |
| DE | 10 2008 020842 | 10/2009 |
| DE | 10 2010 008 741.6 | 2/2010 |
| GB | 2 339 841 | 2/2000 |
| WO | PCT/EP2011/000498 | 2/2011 |

OTHER PUBLICATIONS

International Preliminary Report on Patentability for PCT/EP2011/000498.
International Search Report for PCT/EP2011/000498, mailed on May 16, 2011.
German Office Action for German Priority Patent Application No. 10 2010 008 741.6, issued on Oct. 5, 2010.

* cited by examiner

*Primary Examiner* — Richard M. Camby
(74) *Attorney, Agent, or Firm* — Staas & Halsey LLP

(57) ABSTRACT

A motor vehicle has at least one drive unit for generating a drive torque, and has an accelerator pedal which is acted on with a restoring force and which can be adjusted by an actuating travel in order to predefine a setpoint torque. The motor vehicle also has a control device which actuates the drive unit on the basis of the setpoint torque. The control device additionally determines a presently available drive torque, and as a function of the presently available drive torque, varies the characteristic curve of the accelerator pedal, which expresses the restoring force versus the actuating travel of the accelerator pedal.

14 Claims, 2 Drawing Sheets

MOTOR VEHICLE

CROSS REFERENCE TO RELATED APPLICATIONS

This application is based on and hereby claims priority to International Application No. PCT/EP2011/000498 filed on Feb. 3, 2011 and German Application No. 10 2010 008 741.6 filed on Feb. 20, 2010, the contents of which are hereby incorporated by reference.

BACKGROUND

In a motor vehicle having an electric drive, the available drive torque that can be provided by the electrical machine depends on a large number of influencing variables. For example, the drive power or the traction force on the vehicle wheel may be derated, that is to say throttled, for thermal reasons as a function of the external temperature, the driving profile (power requirement over time) and as a function of the design/dimensioning of the cooling measures in the motor vehicle or on the drive component. Throttling of this kind is due, for example, to component protection (avoiding overheating). This applies, in particular, for electrical power output by the battery and the power conversion in the drive system (power electronics and electrical machine). In addition, the performance of the traction battery depends on further parameters, for example the state of charge, age or temperature.

An, in particular, electric drive unit is provided for generating a drive torque in a motor vehicle of this generic type. The motor vehicle has an accelerator pedal which is subjected to the action of a restoring force, it being possible for the accelerator pedal to be adjusted by an actuating movement in order to prespecify a setpoint torque. A control device can actuate the drive unit, in order to generate a drive torque, on the basis of a setpoint torque set by the driver.

The drive torque which is currently available during driving can vary as a function of specific driving situations. In specific driving situations, for example when executing an overtaking maneuver, the electrical machine can provide a relatively high drive power for accelerating and maintaining a specific vehicle speed. However, during a driving situation such as this, the currently available drive torque can drop on account of the above-mentioned parameters, and therefore the high drive power can be provided only briefly.

Against this background, information about the drive capability of the motor vehicle is of great importance to the driver.

SUMMARY

One potential object is to provide a motor vehicle in which the driver is informed about the respectively currently available drive torque depending on the situation.

The inventors propose a control device that ascertains a currently available drive torque on the basis of the abovementioned influencing variables. The control device can then vary the characteristic curve of the accelerator pedal, which characteristic curve shows the restoring force with respect to the actuating movement of the accelerator pedal, as a function of the drive torque which is currently available for specific driving situations. In contrast to feedback by optical and/or acoustic indicators, haptic feedback is provided by the accelerator pedal, it being possible for this haptic feedback to be intuitively detected by the driver in the event of a change in the currently available drive torque. Therefore, corresponding changes in the restoring force can prompt the driver to throttle the vehicle speed on account of a reduction in the available drive torque.

Force-feedback accelerator pedals, as are known from DE 10 2008 020 842 A1 for example, are particularly suitable for technically implementing the inventors' proposals. In the case of an accelerator pedal of this kind, the characteristic curve profile of the accelerator pedal can be changed by corresponding actuation of the control device. Therefore, accelerator pedals of this kind can not only be used by the driver to notify the control device of the desired drive power/torque as a function of the selected accelerator pedal position, but the accelerator pedal can inform the driver whether or to what extent the drive power or the drive torque is available by a restoring force which changes depending on the situation.

In a preferred embodiment, in the event of an increase in the currently available drive torque, this increase being ascertained by the control device, the gradient of the pedal characteristic curve is reduced at least in regions. Therefore, the counterpressure is accordingly reduced in the event of pedal operation by the driver, this suggesting to the driver that a sufficient amount of drive torque is available. In contrast, in the event of a reduction in the currently available drive torque, the control device can increase the gradient of the pedal characteristic curve at least in regions. In this case, the counterpressure therefore increases when the pedal is operated, this indicating to the driver that only a limited amount of drive torque is available.

As an alternative or in addition to this, there may be at least one pressure point or a force level within the actuating range of the accelerator pedal. In the event of the pedal being operated, this can be perceived by the driver as a brief increase in the counterpressure. The pressure point can be positioned at different actuating movement positions within the actuating range of the accelerator pedal as a function of the currently available drive torque. Therefore, the control device can move the pressure point away from the inoperative position of the accelerator pedal within the actuating range when a sufficient amount of drive torque is available. In contrast, the pressure point can be shifted in the direction of the inoperative position of the accelerator pedal within the actuating range, for example when specific driving situations which require a high drive power arise. This indicates to the driver a drive torque which is present only to a limited extent with respect to the current driving situation.

In order to provide the driver with even more detailed information about the currently available drive torque, the abovementioned pressure point can separate component actuating ranges from one another, the characteristic curve running with different gradients within the component actuating ranges. Therefore, the gradient of the characteristic curve in a first component range which is present between the inoperative position of the accelerator pedal and the pressure point can particularly preferably be lower than in a second component range which follows after the pressure point has been passed. In this case, the characteristic curve profile in the first and in the second actuating range can preferably be linear in each case, as a result of which the pressure point at the transition between the two component actuating ranges can be perceived intuitively particularly well by the driver.

In addition to the first pressure point, a second pressure point can be provided within the pedal actuating range, the second pressure point being positioned between the first pressure point and a movement stop of the accelerator pedal, the accelerator pedal stopping against the movement stop when it is fully depressed. When this second pressure point is passed, firstly the driver's request for maximum power output of the motor vehicle can be transmitted to the control device and, secondly, the driver receives feedback that, in contrast, the time until a system-related drop in power is correspondingly reduced.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
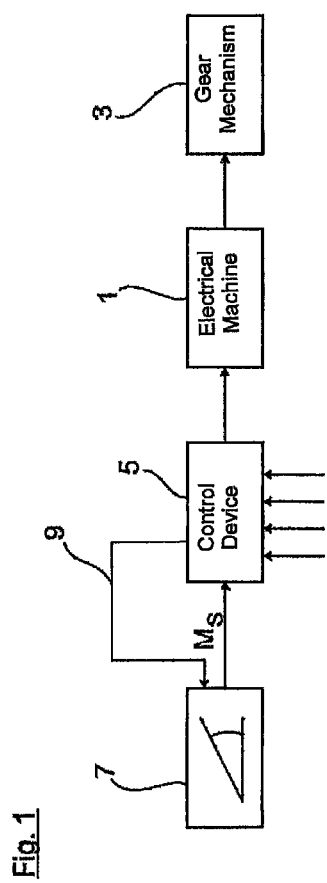
FIG. 1 shows a schematic illustration of a drive train of the motor vehicle.

Reference will now be made in detail to the preferred embodiments of the present invention, examples of which are illustrated in the accompanying drawings, wherein like reference numerals refer to like elements throughout.

FIG. 1 shows a highly schematic illustration of the important drive components of a motor vehicle having an electric drive. The motor vehicle has, as a drive unit, an electrical machine 1 which is coupled to a gear mechanism device 3 by a drive train. The drive torque which is generated by the electrical machine 1 can be transmitted to drive wheels (not illustrated) by the gear mechanism device 3. The electrical machine 1 can be actuated by an electronic control device 5 which detects, as input variables, a large number of vehicle operating parameters, for example an external temperature, the state of charge or the temperature of the battery (not illustrated here) or other driving profile parameters. Amongst others, the control device 5 is connected to an accelerator pedal 7. The control device 1 is supplied with a prespecified value, which corresponds to a setpoint torque $M_S$, as a function of the angle of deflection of the accelerator pedal 7. The control device 5 actuates the electrical machine 1 on the basis of the setpoint torque $M_S$ which reflects the driver's request.

At the same time, the control device 5 ascertains the drive torque which is currently available during driving operation on the basis of the relevant influencing variables.

In the present case, the accelerator pedal 7 is in the form of a so-called force-feedback pedal, it being possible for the pedal characteristic curve of this pedal to be varied as function of corresponding control signals from the control device 5. To this end, the control device 5 is connected to the accelerator pedal 7 via the signal line 9. During driving, the control device 5 ascertains a currently available drive torque on the basis of relevant influencing variables, for example the external temperature, the driving profile or the state of charge of the battery. The control device 5 can then influence the profile of the characteristic curve of the accelerator pedal 7, in order to provide the driver with feedback about the drive capability, on the basis of the ascertained currently available drive torque.

Figure 2:
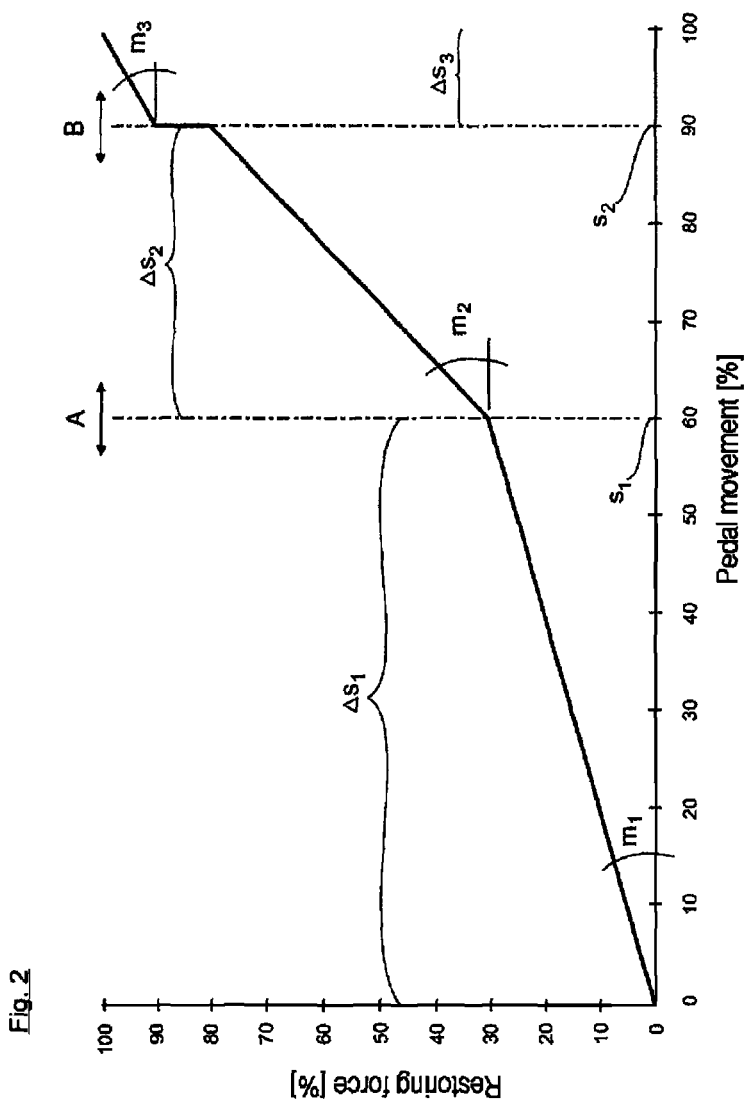
FIG. 2 shows a characteristic curve of the accelerator pedal of the motor vehicle, which characteristic curve shows the restoring force with respect to the pedal actuating movement.

FIG. 2 shows, by way of example, a characteristic curve of the accelerator pedal 7, this characteristic curve showing the restoring force $F_R$ with respect to the pedal actuating movement s.

Pressure points A, B are present at different actuating movement positions $s_1$, $s_2$ within the actuating movement s. Each of these pressure points A, B separates component actuating ranges $\Delta s_1$, $\Delta s_2$, $\Delta s_3$ from one another. In each of these component actuating ranges, the characteristic curve runs linearly and also with different gradients $m_1$, $m_2$, $m_3$. In this case, the gradient $m_1$ in the first component range $\Delta s_1$ between the inoperative position of the accelerator pedal 7 and the first pressure point A is selected to be comparatively low. Accordingly, the restoring force $F_R$ in the first actuating range $\Delta s_1$ of the accelerator pedal 7 is low, as a result of which the driver can be informed that the pedal position selected by him is in a range which is expedient in respect of energy and in which a sufficient amount of drive torque and a relatively large range can be provided.

The second actuating range $\Delta s_2$ extends between the two pressure points A, B, with the gradient $m_2$ in this range being selected to be greater than in the first range $\Delta s_1$. Accordingly, the restoring force $F_R$ increases in the second component range $\Delta s_2$ as the pedal is depressed even more. As a result, the driver receives feedback that he is now no longer in a range which is expedient in respect of energy and in which the drive power can only be provided for a limited period of time, but that after this, a system-related drop in power arises and also a reduced total range can be covered.

In accordance with the characteristic curve profile of FIG. 2, the second pressure point B can be passed only by virtue of an excessive increase in the operating force by the driver. When the second pressure point B is passed, the control device 5 is informed of the driver's request for maximum power output by the motor vehicle. Accordingly, the driver receives feedback via the sudden increase in the restoring force $F_R$ that the time until the system-related drop in power has correspondingly reduced further.

Pressure points A and B can be shifted as a function of the ascertained drive torque. Therefore, each of the pressure points A, B can be moved away from the inoperative position of the accelerator pedal 9 within the actuating movement s when an increase in the currently available drive torque is detected. In contrast, the pressure point A and/or B can be shifted in the direction of the inoperative position of the accelerator pedal within the actuating movement s when a reduction in the currently available drive torque is ascertained.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A motor vehicle comprising:
   a drive unit to generate a drive torque;
   an accelerator pedal which is movable in an actuating range between an inoperative position and a movement stop, the accelerator pedal being movable against a restoring force to adjust an actuating position within the actuating range, the actuating position specifying a setpoint torque, the restoring force varying with respect to the actuating position according to a characteristic curve of the accelerator pedal; and
   a control device which actuates the drive unit based on the basis of the setpoint torque which ascertains a currently available drive torque, and which varies the characteristic curve of the accelerator pedal as a function of the currently available drive torque.

2. The motor vehicle according to claim 1, wherein if the currently available drive torque increases, the control device reduces a gradient of the characteristic curve at least in regions, to thereby reduce the restoring force.

3. The motor vehicle according to claim 1, wherein if the currently available drive torque decreases, the control device increases the gradient of the characteristic curve at least in regions, to thereby increase the restoring force.

4. The motor vehicle according to claim 1, wherein
there is a first pressure point within the actuating range of the accelerator pedal, such that in travelling away from the inoperative position, the accelerator pedal is subjected to an increased restoring force at the first pressure point, and
the control device moves the first pressure point to different actuating positions within the actuating range as a function of the currently available drive torque.

5. The motor vehicle according to claim 4, wherein if the currently available drive torque increases, the control device moves the first pressure point away from the inoperative position of the accelerator pedal.

6. The motor vehicle according to claim 4, wherein if the currently available drive torque decreases, the control device moves the first pressure point toward the inoperative position of the accelerator pedal.

7. The motor vehicle according to claim 4, wherein
the first pressure point separates the actuating range into first and second component sub-ranges, the characteristic curve having different gradients within the component sub-ranges.

8. The motor vehicle according to claim 7, wherein the gradient of the characteristic curve in the first component sub-range, between the inoperative position of the accelerator pedal and the first pressure point, is lower than in the second component sub-range, between the first pressure point and the movement stop.

9. The motor vehicle according to claim 4, wherein there is a second pressure point within the actuating range of the accelerator pedal, the second pressure point being positioned between the first pressure point and the movement stop, such that in travelling toward the movement stop, the accelerator pedal is subjected to an increased restoring force at the second pressure point.

10. The motor vehicle according to claim 1, wherein the drive unit has at least one electrical machine.

11. The motor vehicle according to claim 7, wherein the characteristic curve has a substantially constant gradient with each component sub-range.

12. The motor vehicle according to claim 1, further comprising a battery, wherein the drive unit comprises an electrical machine powered by the battery.

13. The motor vehicle according to claim 12, wherein the control device ascertains the currently available drive torque based on at least one of external temperature, a driving profile and a state of charge of the battery.

14. The motor vehicle according to claim 1, wherein the control device ascertains the currently available drive torque based external temperature, a driving profile and a state of charge of the battery.

* * * * *

UNITED STATES PATENT AND TRADEMARK OFFICE
CERTIFICATE OF CORRECTION

PATENT NO. : 8,457,840 B2
APPLICATION NO. : 13/579118
DATED : June 4, 2013
INVENTOR(S) : Walter Schmidt et al.

Page 1 of 1

It is certified that error appears in the above-identified patent and that said Letters Patent is hereby corrected as shown below:

In the Claims

Column 4, Line 61-62, In Claim 1, after "on" delete "the basis of".

Column 4, Line 62, In Claim 1, delete "torque" and insert -- torque, --, therefor.

Signed and Sealed this
Tenth Day of September, 2013

Teresa Stanek Rea
*Acting Director of the United States Patent and Trademark Office*